United States Patent
Chua et al.

(10) Patent No.: US 10,067,815 B2
(45) Date of Patent: Sep. 4, 2018

(54) PROBABILISTIC PREDICTION OF SOFTWARE FAILURE

(71) Applicant: International Business Machines Corporation, Armonk, NY (US)

(72) Inventors: Wei Liang Chua, Singapore (SG); Tien Hiong Lee, Singapore (SG); Konstantin Levinski, Singapore (SG); Weng Sing Tang, Singapore (SG)

(73) Assignee: International Business Machines Corporation, Armonk, NY (US)

( * ) Notice: Subject to any disclaimer, the term of this patent is extended or adjusted under 35 U.S.C. 154(b) by 46 days.

(21) Appl. No.: 15/187,833

(22) Filed: Jun. 21, 2016

(65) Prior Publication Data

US 2017/0364402 A1      Dec. 21, 2017

(51) Int. Cl.
   *G06F 11/07*      (2006.01)
(52) U.S. Cl.
   CPC ........ *G06F 11/079* (2013.01); *G06F 11/0751* (2013.01); *G06F 11/0787* (2013.01)
(58) Field of Classification Search
   CPC ..... G06F 11/079; G06F 11/07; G06F 11/0751
   USPC .................................................. 714/37, 47.2
   See application file for complete search history.

(56) References Cited

U.S. PATENT DOCUMENTS

| | | | | |
|---|---|---|---|---|
| 5,463,768 A | * | 10/1995 | Cuddihy | ............ G06F 11/2205 714/37 |
| 6,343,236 B1 | | 1/2002 | Gibson et al. | |
| 6,353,902 B1 | * | 3/2002 | Kulatunge | ............ H04L 41/06 714/47.3 |
| 7,895,323 B2 | * | 2/2011 | Gupta | ................... G06F 11/008 706/15 |
| 8,255,351 B2 | | 8/2012 | Lee et al. | |
| 2002/0091972 A1 | * | 7/2002 | Harris | ................... G06F 11/008 714/47.2 |
| 2005/0246590 A1 | * | 11/2005 | Lancaster | ............ G06F 11/076 714/47.2 |
| 2015/0227838 A1 | | 8/2015 | Wang et al. | |
| 2015/0227847 A1 | | 8/2015 | Noel et al. | |

* cited by examiner

*Primary Examiner* — Kamini B Patel
(74) *Attorney, Agent, or Firm* — Heather S. Chatterton

(57) ABSTRACT

A log entry identifies an error in the computer or other system. Another log entry identifies a symptom associated with the system error. The symptom occurs in timeframe prior to the system error and a variable score is determined for the symptom according to the timeframe, the consistency with which the symptom appears along with the error, and the frequency with which the symptom occurs throughout the system log. A new occurrence of the symptom is identified. Whether the symptom's variable score exceeds a threshold value for the symptom is determined. In response to determining that the symptom's variable score exceeds the threshold value, an alert indicating that the associated system error is probable is displayed.

15 Claims, 6 Drawing Sheets

PROBABILISTIC PREDICTION OF SOFTWARE FAILURE

BACKGROUND

The present disclosure relates to preventing software failure, and more specifically, to probabilistic prediction of when software failure will occur.

Software failure is generally considered to have occurred when a program performs incorrectly or produces an unexpected result. Failures in software are often called bugs, errors, or faults. Failures may arise from a number of sources, including coding errors, unintended interactions between different parts of a program, etc.

SUMMARY

Disclosed herein are embodiments of a method, computer program product, and computer system for probabilistic prediction of system errors.

According to embodiments of the present disclosure, a computer-implemented method for probabilistic prediction of system errors is described. The method may generally begin by reading a system log. The system log may generally be made up of a plurality of log entries, including log entries which may identify an error in the system. The method may proceed to identify a log entry indicating a system error. The method may further identify a symptom or set of symptoms, each symptom being a log event, associated with the system error. Each symptom may be associated with a timeframe prior to the system error, such that the symptom occurs within the associated timeframe. A variable score may be determined for each symptom according to the symptom's timeframe, the consistency with which the symptom appears along with the error, and the frequency with which the symptom occurs throughout the system log.

A new occurrence of the symptom or set of symptoms may be identified in the system log. In response to identifying the new occurrence of the set of symptoms, a determination may be made as to whether each symptom's variable score exceeds a threshold value for the symptom. In response to determining that each symptom's variable score exceeds the threshold value for the symptom, an alert may be displayed indicating that the associated system error is likely to occur.

According to embodiments of the present disclosure, a system for probabilistic prediction of system errors is described. The system may include a memory and a processor in communication with the memory. The system may be configured to perform an operation which may include reading a system log made up of a plurality of log entries. The system may identify, in the system log, a log entry indicating a system error and a symptom or set of symptoms associated with the system error. Each symptom may be associated with a timeframe occurring prior to the system error, such that the symptom occurs within the timeframe. The system may determine a variable score for each symptom, according to each symptom's timeframe, the consistency with which the symptom appears along with the error, and the frequency of the symptom's occurrence throughout the system log.

The system may identify, in the system log, a new occurrence of the symptom or set of symptoms. The system may determine, in response to identifying the new occurrence of the set of symptoms, whether each symptom's variable score exceeds a threshold value for the symptom. The system may provide, in response to determining that each symptom's variable score exceeds the threshold value for the symptom, an alert indicating the system error will probably occur.

According to embodiments of the present disclosure, a computer program product for probabilistic prediction of system errors is described. The computer program product may be a computer readable storage medium having program instructions embodied therewith, wherein the computer readable storage medium is not a transitory signal per se. The program instructions may be executable by a processor to perform a method. The method may include reading a system log made up of a plurality of log entries. A log entry indicating a system error may be identified, in the system log, along with a symptom or set of symptoms associated with the system error. Each symptom may be associated with a timeframe occurring prior to the system error. A variable score may be determined for each symptom, according to the symptom's timeframe, the consistency with which the symptom appearing along with the error, and the occurrence frequency of the symptom throughout the system log.

A new occurrence of the symptom or set of symptoms may be identified in the system log. In response to identifying the new occurrence of the set of symptoms, a determination may be made as to whether each symptom's variable score exceeds a threshold value for the symptom. In response to determining that each symptom's variable score exceeds the threshold value for the symptom, an alert indicating the system error will probably occur may be provided.

The above summary is not intended to describe each illustrated embodiment or every implementation of the present disclosure.

BRIEF DESCRIPTION OF THE DRAWINGS

The drawings included in the present application are incorporated into, and form part of, the specification. They illustrate embodiments of the present disclosure and, along with the description, serve to explain the principles of the disclosure. The drawings are only illustrative of certain embodiments and do not limit the disclosure.

Figure 1:
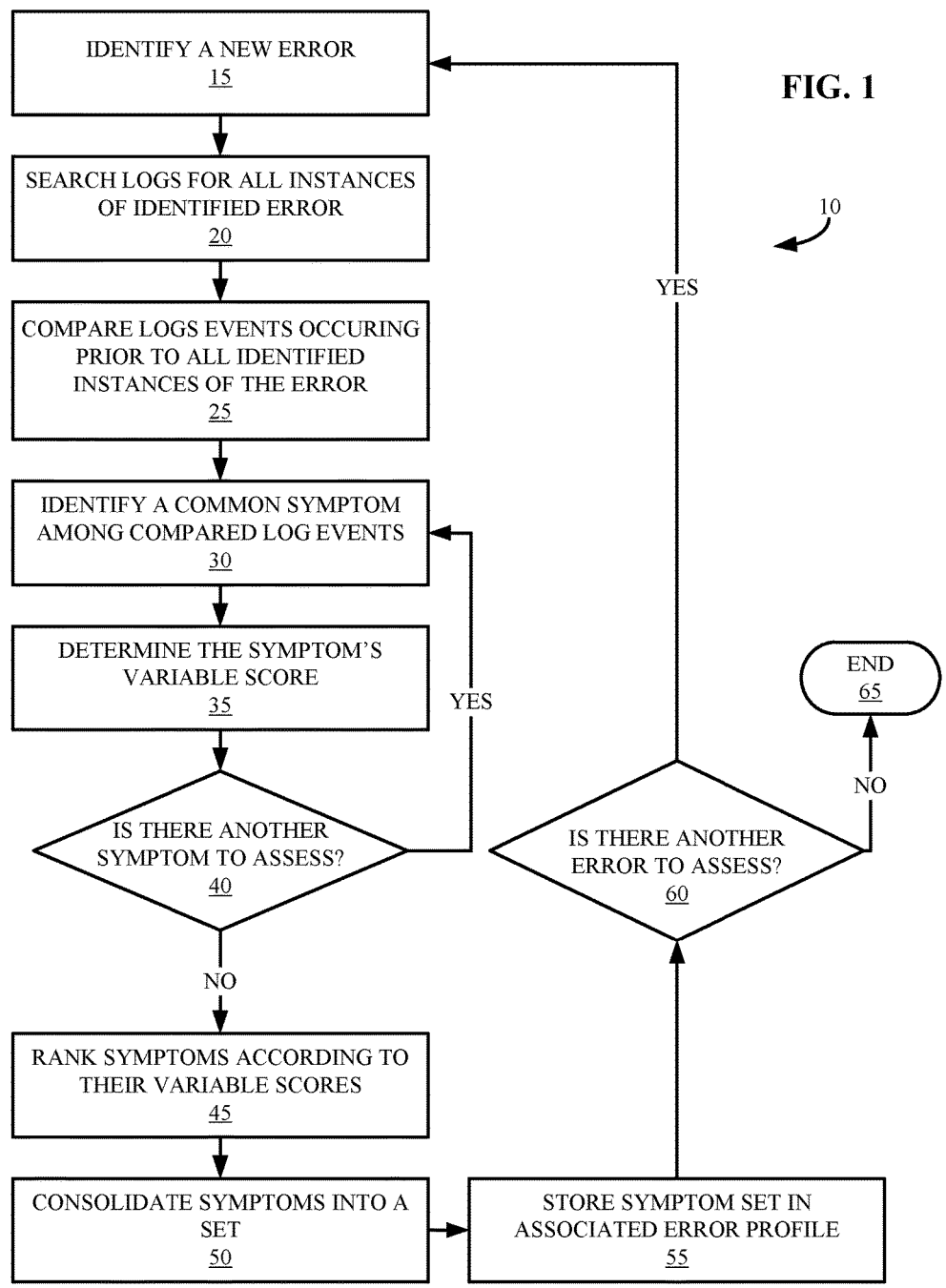
FIG. 1 depicts a flowchart of an example method of a learning phase using historical logs according to an embodiment of the present disclosure.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the invention.

DETAILED DESCRIPTION

Aspects of the present disclosure relate to preventing software failure, more particular aspects relate to probabilistic prediction of when software failure will occur. While the present disclosure is not necessarily limited to such applications, various aspects of the disclosure may be appreciated through a discussion of various examples using this context.

Technology is often relied upon when speed and efficiency are especially important, making any errors or problems arising with the technology costly, both in terms of repairs and lost time. It is therefore important for errors and problems within the technology system, e.g. a computer system, to be detected and resolved as quickly as possible. As these problems may lead to undesired and even disastrous results, the ability to predict errors before they occur may be highly useful (e.g., limit negative effects by allowing measures to be taken to resolve the issue preemptively).

Many computer software systems produce output in the form of logs, which may note when something wrong, irregular, or unusual occurs, in addition to recording expected events. This disclosure makes use of the generation of the system logs by automatically reading and assessing the system logs to provide predictive alerts of possible errors. This may be done in order to detect and predict errors, allowing preemptive steps to be taken to mitigate the effects of the errors. Before a problem occurs, there may be a number of symptoms that emerge that are logged by the various computer systems or subsystems which may be involved. By analyzing errors that have previously occurred along with the portion of the system log generated in a time frame before an error occurred, patterns of log events may be identified to allow predictions of problems likely to occur in the future. Through learning from the logs generated during past errors, a list of symptoms that are likely to appear before an error can be developed.

This learning may occur during an independent learning phase and rely upon archival logs, or may occur in real-time, as logs are generated, or some combination of the two, e.g. learning from archival and real-time logs may occur in parallel. As symptoms are identified and associated with particular errors, the symptoms may be organized into sets and stored along with the associated error, such as in an error profile. Each symptom may be assigned a variable score, based on the circumstances of its occurrence, and ranked within a set based on that score. Each symptom may additionally have an associated threshold value, used to compare to the variable score to assess the probability of an error based on the conditions present when the symptom appears in the logs.

Upon detection of the symptom, or symptoms, associated with a particular error, which may occur as the log event, or events, are entered into the log, a warning of the impending error may be provided. Effectively predicting errors before they occur may advantageously provide the system and the user with valuable additional time with which to respond to, or perhaps prevent, the error. By minimizing error occurrence, and also minimizing the impact of errors that do occur, systems may operate more reliably and with reduced repair costs. This method allows the system logs to be used proactively, and may utilize the system's native log format.

It is to be understood that the aforementioned advantages are example advantages and should not be construed as limiting. Embodiments of the present disclosure can contain all, some, or none of the aforementioned advantages while remaining within the spirit and scope of the present disclosure.

Referring now to FIG. 1, an example method 10 of a learning phase according to an embodiment of the present disclosure is depicted in a flowchart. Method 10 depicts an example of a learning phase using historical or archival system logs.

While reviewing historical logs, a new error may be identified, as in operation 15. Errors may generally be called out as such within the system log itself, or may be identified by comparison to a master list of possible errors, by keyword, by resulting log events, etc. In some embodiments, a particular error may be sought out and a profile developed for that specific error as directed by a third-party system or a user, rather than a target error being identified from the system logs.

The system logs may be searched for all instances of the identified target error, as in operation 20. This may generally be accomplished by a keyword search, but any means of searching the logs may be used. The log may also be reviewed for events occurring prior to each identified instance of the error, and these log events compared among the different instances of the error, as in operation 25. By comparing the log events that occur prior to each of the different instances of the error, a symptom commonly appearing among the different instances of the error may be identified, as in operation 30.

A symptom is a log event which may generally be associated with a particular error through a consistent pattern of appearance in conjunction with the error, or other correlations may be used. A symptom may be a particular log entry, or the absence of a particular log entry, as either may be a type of log event. For example, if a particular log entry regularly occurs at a particular time or in a particular interval and does not appear as expected, the absence of the log entry would constitute a log event. If such a log event were found to occur in association with a particular error, the log event (i.e. that absence of the log entry) would be a symptom of that error.

A variable score may be determined for each identified symptom, as in operation 35. The variable score may be used to quantify a given symptom's probability of accurately anticipating an associated error. Generally, the variable score may be calculated according to the symptom's timeframe, the consistency with which the symptom appears prior to the associated error, and the symptom's frequency of occurrence throughout the system log, independent of consideration of the associated error. These factors, or any others which may be used, may be quantified in any number of ways.

For example, the symptom's frequency of occurrence throughout the log may be counted and stored as a round number, and the timeframe may be expressed using any standard units of time. Consistency of appearance with the error may be determined by statistical analysis of the frequency of appearance of the symptom compared with the frequency of appearance of the error and other associated symptoms.

A formula, such as the following example, may be used in some embodiments to calculate the variable score:

$$P(F)=C_i/C^*(1-\sigma_i/x)$$

Wherein P(F) is the variable score of a particular symptom, $C_i$ is the number of the occurrences of the symptom throughout the log, C is the total number of log entries, $\sigma_i$ is the standard deviation of the time of occurrence of each symptom before the associated error, with respect to the mean time of all occurrences of that particular symptom, and x is the mean time of all occurrences of the particular symptom, measured in its distance away (in time) from the occurrence of the associated error. A symptom with a high frequency of occurrence and which occurs at a regular distance (in time) in relation to the error would receive a high score indicating that the symptom is a strong predictor of the associated error.

Each symptom may also be associated with a particular timeframe in relation to the error, the timeframe describing the symptom's "distance" from the error and other symptoms in the set, if there are other symptoms associated with the error. The timeframe may be described as a range of time, as a fixed point in time before the error, or both may be utilized by the method, depending on the nature of the appearance of the symptom and its association with the error and other symptoms associated with the error.

For example, if a "buffer overflow" and a "stack overflow" event were each identified as a symptom for an "out of memory error" each would be associated with a timeframe in relation to the error and to each other. One of these timeframes may be fixed, e.g., the "stack overflow" may consistently appear 10 minutes before the error, and one may be ranged, e.g., the "buffer overflow" may generally appear between 16-24 minutes before the error. In this example, the "stack overflow" would generally appear between 6-14 minutes after the "buffer overflow," and would, together, indicate that an "out of memory error" may be probable within 10 minutes. The timeframe may generally be useful in calculating a symptom's variable score.

It may be determined whether there is another symptom to assess for the identified error, as in decision block 40. If so, a new common symptom to assess may be identified, as in operation 30. If not, the scored symptoms may be ranked according to their variable scores, as in operation 45.

If an error has multiple associated symptoms, the symptoms may be consolidated into a set, as in operation 50. The set of symptoms may be stored in an associated error profile, as in operation 55. Multiple symptoms associated with a particular error may be consolidated into a set and stored with the associated error profile, if error profiles are employed by the embodiment in use. In addition to associated symptoms, error profiles may store other data relative to the error, such as the content of the expected error message, a count of occurrences of the error, etc.

For example, both "buffer overflow" and "stack overflow" may be identified to occur in a consistent time period before an "out of memory error." To consolidate this data, "buffer overflow" and "stack overflow" may be combined into a symptom set, and that set stored in an "out of memory error" profile. Additional symptoms may also be added to the set as they are identified. Alternative means of associating symptoms and errors may be used, for example, each symptom may be independently associated with each relevant error and stored separately.

If, as in the example above, the method identified "buffer overflow" and "stack overflow" as symptoms of an "out of memory error," then an association may be created between each of "buffer overflow" and "stack overflow" and the "out of memory error." The associations may be stored separately, such as if they were organized by the symptoms themselves, rather than by the error, as in the example above using an error profile.

The system log may be reviewed to determine whether it contains another error for assessment, as in decision block 60. If another error for assessment is present, the new error for assessment may be identified, as in operation 15. If no errors remain to be assessed, the learning phase using historical logs may end, as in operation 65.

Figure 2:
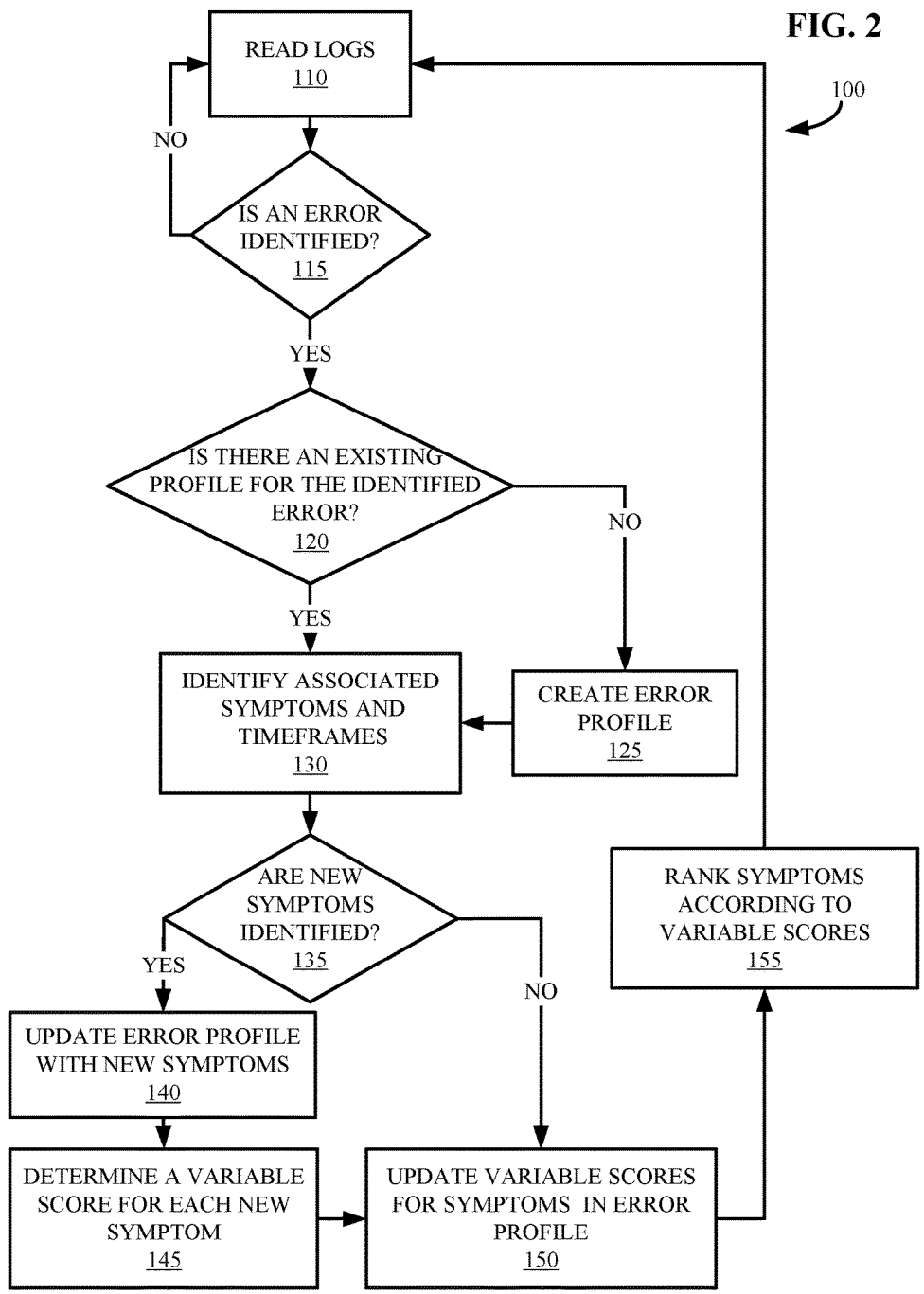
FIG. 2 depicts a flowchart of an example method of a learning phase using real-time logs according to an embodiment of the present disclosure.

Referring now to FIG. 2, illustrated is an example method 100 of a learning phase according to an embodiment of the present disclosure is depicted in a flowchart. Method 100 is an example of a learning phase using real-time logs.

The system logs may be read, as in operation 110. The logs may generally be generated by the system and read in real-time. The logs may generally be made up of a series of log entries recording various system events. Reading the logs may consist of scanning the logs for certain keywords or phrases, or any other means of differentiating among log entries.

While reading the logs, a log entry indicating an error may be identified, as in decision block 115. If a log entry indicating an error is not identified, the system logs may continue to be read, as in operation 110. If a log entry indicating an error is identified, it may be determined whether an error profile for the identified error already exists, as in decision block 120. If no existing error profile is found, one may be created, as in operation 125, before proceeding to identifying associated symptoms and their timeframes, as in operation 130.

If an existing error profile is found, symptoms associated with the error may be identified along with their timeframes, as in operation 130. In other embodiments, the error profile may be located or created at any other point in the method 100, such as after the associated symptoms and their timeframes are identified. In still other embodiments, the method 100 may operate without error profiles, and may use another means to catalog and organize error and symptom data (e.g. symptom profiles).

Any identified symptoms may be assessed to determine if the identified symptom is a new, or not previously identified, symptom, as in decision block 135. This may be accomplished by comparing the identified symptom with a symptom set stored in the error profile, if error profiles are used, by searching a symptom database for keywords, or by any other means. If the identified symptom is determined to be a new symptom, the error profile may be updated to reflect the new symptom, as in operation 140.

If an embodiment utilizes a different means for storing an error's associated symptom set, other than an error profile, then updating the symptom set to reflect any newly identified symptoms may vary accordingly. If an identified symptom is determined to be a new symptom, an additional step (not shown) of verifying the new symptom may be performed. Verifying the new symptom may generally consist of comparing the new symptom to archival or historical logs of the associated error, and determining whether the new symptom occurs consistently enough with the associated error to be a reliable indicator of the error's probable occurrence.

A variable score may be determined for each newly identified symptom, as in operation 145. The evaluation of the scores may be indefinite, such that each variable score may be updated with each new occurrence of the symptom, as in operation 150. Further considerations for the determination of a symptom's variable score are discussed below.

If no new symptoms were identified, the existing variable scores may be updated, as in operation 150. If, as discussed above, a formula is used to calculate the variable score, then each new occurrence of the symptom in the system log will adjust the variable values within the formula. That is, a recalculation will allow the variable score to adjust to reflect an appropriate new value according to the new occurrence of the symptom. For example, if, as in the example used above, a "buffer overflow" event were to occur without a subsequent "stack overflow" event or "out of memory error." The variable score for the "buffer overflow" event may be reduced accordingly. This may be done to reflect that the "buffer overflow" may occur without the error, and thus, alone, may not reliably predict that the error is likely to occur. In other embodiments, existing variable scores may be updated prior to determining an initial score for any newly identified symptoms, or at any other point in the method 100.

Symptoms may also be ranked according to their variable scores, as in operation 155. This ranking may be advantageous in determining threshold values, discussed below, or otherwise informative to the system or user. For example, a ranking may place symptoms associated with high scores (e.g., those most likely to accurately predict that an error is likely to occur) near the top of a ranking list, so that they may be more noticeable, such as if the ranking were displayed to a user.

When the steps of the method 100, as warranted by the current content of the system logs, are complete, the logs may continue to be read, as in operation 110.

Figure 3:
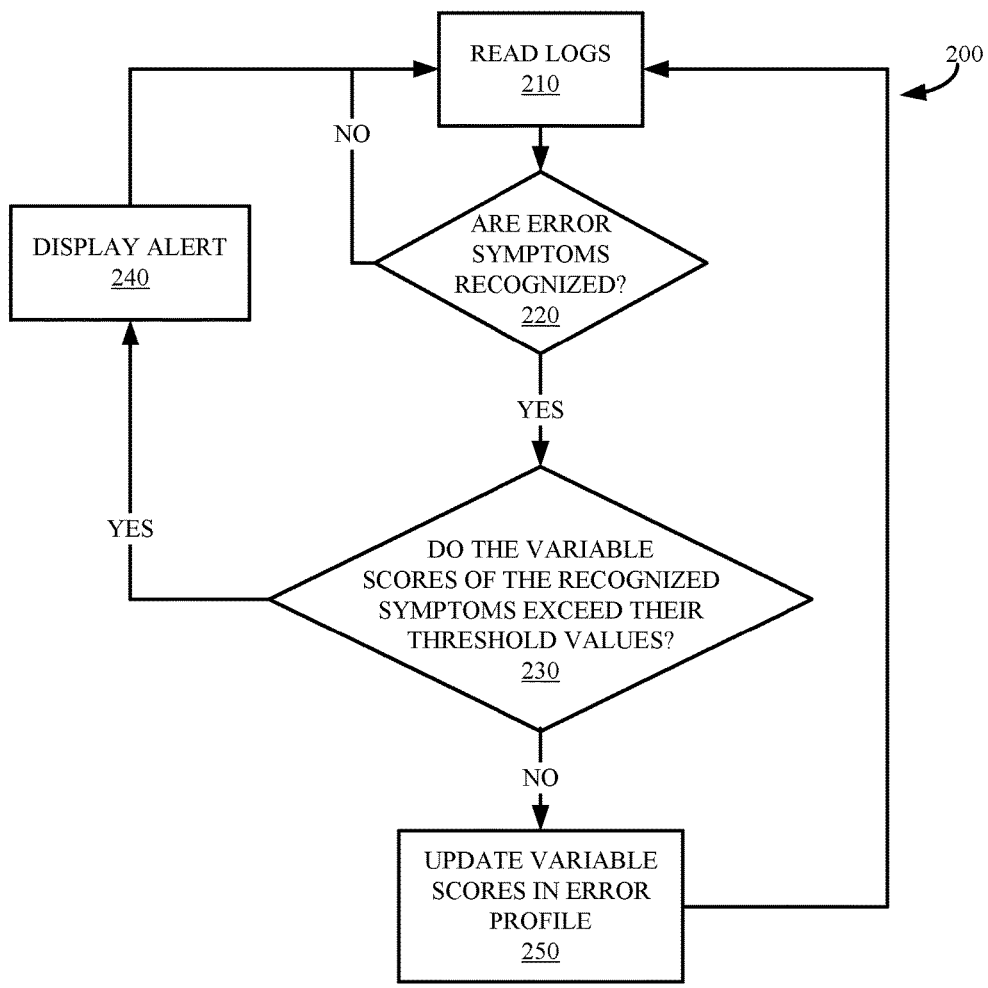
FIG. 3 depicts a flowchart of an example method for a system to use probabilistic scoring of symptoms to provide a predictive alert of an impending error according to an embodiment of the present disclosure.

Referring now to FIG. 3, a flowchart of an example method 200 for a system to use probabilistic scoring of symptoms to provide a predictive alert of an impending error is shown. The flowchart provides a visualization of the example method 200.

Entries into the system log may continuously be read, as in operation 210. Reading the logs may involve any means that allows the system log to be monitored for new log entries and differing log entries to be distinguished from one another. The system log may be read for symptoms, indications of symptoms, errors, indications of errors, or other useful data. As an example, the system log may be read for recognition of symptoms of an error, such as by keyword or comparison to maintained list of possible symptoms, as in decision block 220. If no symptoms are recognized, the logs may continue to be read, as in operation 210.

If a symptom of an error is identified in the log, it may be determined whether the variable score of the recognized symptom exceeds the symptom's threshold value, as in decision block 230. In some embodiments, the threshold value may be set internally by the system itself using a calculation or a default value, e.g. the threshold value may be set by rounding up the variable score to the next round number or set by an independent calculation using the symptom's variable score, occurrence frequency throughout the system log, and distance from the error as factors. In other embodiments, the threshold value may be set externally, by a third-party system or a user, e.g. a ranking of symptoms associated with a particular error may displayed on a graphical user interface allowing a user to view the ranked symptoms and input threshold values. It may generally be desirable for the threshold value to be substantially similar to, or somewhat higher than, the variable score, so that the appearance of a symptom may reliably trigger an alert. In embodiments allowing the user to set the threshold value, the ranking of symptoms by variable score may be a valuable resource.

Each symptom may have its own threshold value, in accordance with its own variable score. If, for example, an error profile were to have only a single associated symptom, then only a single threshold value needs to be met to trigger the alert, such as in the example below:

| SYMPTOM 1 | THRESHOLD 1 |

But, in another example, an error profile may have multiple symptoms associated with a particular error. In such a case, each symptom may have to meet its own threshold value, as shown in the example below, before the alert may be triggered:

| SYMPTOM 1 | THRESHOLD 1 |
| SYMPTOM 2 | THRESHOLD 2 |
| SYMPTOM 3 | THRESHOLD 3 |
| SYMPTOM 4 | THRESHOLD 4 |

If multiple symptoms are associated with a particular error, an alert associated with the error may be triggered by meeting a single threshold value in some embodiments, may require each threshold value be met in others, or the alert may be triggered by some intermediate degree of threshold satisfaction.

When an identified symptom, or set of symptoms, meets or exceeds its threshold value, or associated set of threshold values, an alert may be provided, as in operation 240. The alert may consist of a text box appearing on a graphical user interface accessed by the system, an auditory tone, or any other means of providing an alert to the user. After providing the alert, the system logs may continue to be read, as in operation 210.

If, instead, the method finds that the variable score of the recognized symptom does not exceed its threshold value, the symptom's variable score may be updated accordingly, as in operation 250. The system logs may then continue to be read, as in operation 210.

Figure 4:
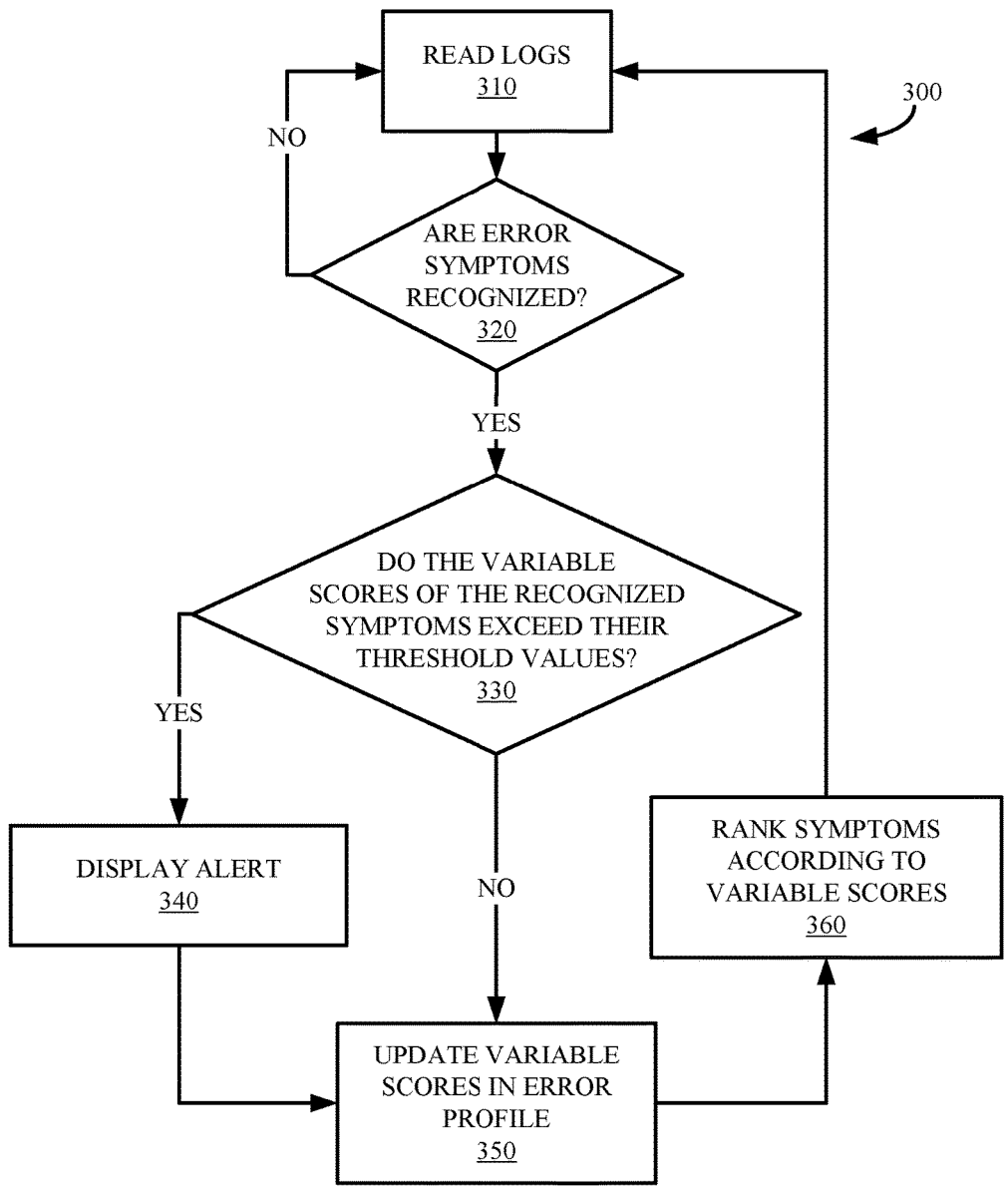
FIG. 4 depicts a flowchart of an alternative example method for a system to use probabilistic scoring of symptoms to provide a predictive alert of an impending error according to an embodiment of the present disclosure.

Referring now to FIG. 4, a flowchart of another example method 300 for a system to use probabilistic scoring of symptoms to provide a predictive alert of an impending error is shown. The flowchart provides a visualization of the example method 300.

The system logs may continuously be read, as in operation 310. The logs may be continuously reviewed and monitored for a symptom of an error, as in decision block 320. If no symptoms are recognized, the logs may continue to be read, as in operation 310. If a symptom is recognized, it may be determined whether the recognized symptom's variable score exceeds its threshold value, as in decision block 330. If the recognized symptom's variable score does exceed its threshold value, an alert may be displayed, as in operation 340.

The variable score of the recognized symptom may be updated, as seen in operation 350. The score may be updated following the alert, as shown in flowchart 300, or may occur at any other point in the method. The variable score may be updated according to any new data the method obtained by reading the logs, or otherwise.

For instance, any new occurrence of symptom may provide new information about that symptom, depending on the circumstance of the occurrence, i.e., with or without the associated error and/or other associated symptoms, in an unexpected timeframe, etc. This new information may be quantified, as discussed above, and used to update the symptom's variable score. If the variable score is updated, a ranking of a set of symptoms including the recognized symptom may also be updated according to the recognized symptom's updated variable score, as in operation 360. The ranking may be stored in an appropriate error profile, if profiles are used.

Figure 5:
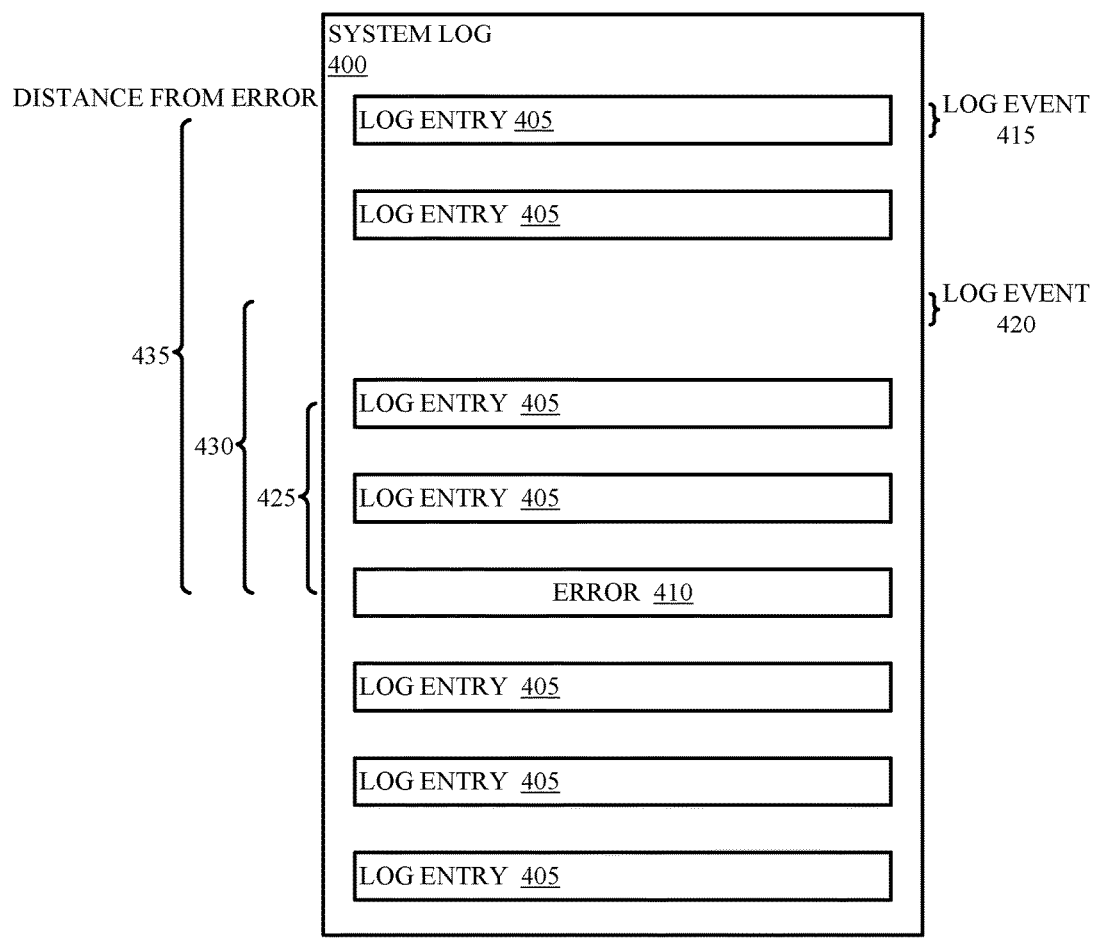
FIG. 5 depicts an example system log according to an embodiment of the present disclosure.

Referring now to FIG. 5, an example system log 400 is depicted, according to embodiments of the current disclosure. The system log 400 is made up of successive log entries 405. Log entries 405 may contain a variety of data about the system, such as information about unexpected system events or confirmation of the execution of expected periodic events, and may also include entries indicating an error 410 has occurred. As the log is read, any log entry 405 may be treated as a log event 415, and the absence of a particular log entry may also be treated as a log event 420.

Distances, as discussed above, refer to the time elapsed between the log event 415, 420 and the error 410. Log entries 405 may be entered into the system log 400 in regular time intervals, irregularly, e.g. as they occur, or some combination of measured intervals and irregular entry. Log entries 405 may generally be entered in successive chronological order, allowing simple determination of the distance associated with particular log entries 405. For example, the log entry 405 at distance 425 would be closer to, and thus potentially a stronger predictor of, the error 410 than the log entry 405 at distance 435. Likewise the log event 420, noting the absence of a log entry, at distance 430 would also be closer to, and thus may be a stronger predictor of, the error 410 than the log entry at distance 435. If, in some embodiments, log entries 405 are not entered chronologically, distance from error may be determined by other means, e.g. entries entered out of chronological order may include timestamps indicating when the event occurred, separate from the time the log entry in made.

Figure 6:
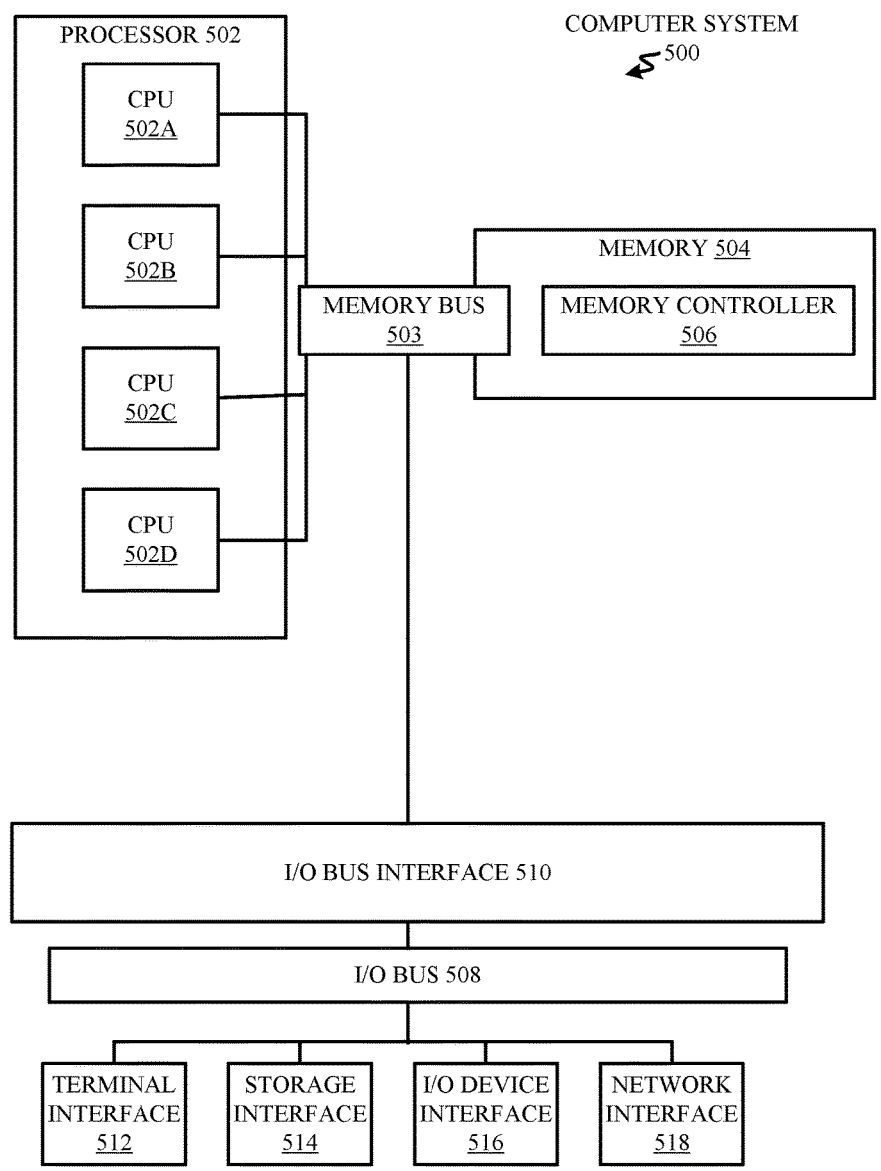
FIG. 6 depicts a high-level block diagram of an example computer system that may be used in implementing the method of probabilistic prediction of system errors in accordance with embodiments of the present disclosure.

Referring now to FIG. 6, shown is a high-level block diagram of an example computer system (i.e., computer) 500 that may be used in implementing the method of probabilistic prediction of system errors, and any related functions or operations, described herein (e.g., using one or more processor circuits or computer processors of the computer), in accordance with embodiments of the present disclosure. In some embodiments, the major components of the computer system 500 may comprise one or more CPUs 502, a memory subsystem 504, a terminal interface 512, a storage interface 514, an I/O (Input/Output) device interface 516, and a network interface 518, all of which may be communicatively coupled, directly or indirectly, for inter-component communication via a memory bus 503, an I/O bus 508, and an I/O bus interface unit 510.

The computer system 501 may contain one or more general-purpose programmable central processing units (CPUs) 502A, 502B, 502C, and 502D, herein generically referred to as the CPU 502. In some embodiments, the computer system 500 may contain multiple processors typical of a relatively large system; however, in other embodiments the computer system 500 may alternatively be a single CPU system. Each CPU 502 may execute instructions stored in the memory subsystem 504 and may comprise one or more levels of on-board cache.

In some embodiments, the memory subsystem 504 may comprise a random-access semiconductor memory, storage device, or storage medium (either volatile or non-volatile) for storing data and programs. In some embodiments, the memory subsystem 504 may represent the entire virtual memory of the computer system 500, and may also include the virtual memory of other computer systems coupled to the computer system 500 or connected via a network. The memory subsystem 504 may be conceptually a single monolithic entity, but, in some embodiments, the memory subsystem 504 may be a more complex arrangement, such as a hierarchy of caches and other memory devices. For example, memory may exist in multiple levels of caches, and these caches may be further divided by function, so that one cache holds instructions while another holds non-instruction data, which is used by the processor or processors. Memory may be further distributed and associated with different CPUs or sets of CPUs, as is known in any of various so-called non-uniform memory access (NUMA) computer architectures. In some embodiments, the main memory or memory subsystem 504 may contain elements for control and flow of memory used by the CPU 502. This may include a memory controller 505.

Although the memory bus 503 is shown in FIG. 6 as a single bus structure providing a direct communication path among the CPUs 502, the memory subsystem 504, and the I/O bus interface 510, the memory bus 503 may, in some embodiments, comprise multiple different buses or communication paths, which may be arranged in any of various forms, such as point-to-point links in hierarchical, star or web configurations, multiple hierarchical buses, parallel and redundant paths, or any other appropriate type of configuration. Furthermore, while the I/O bus interface 510 and the I/O bus 508 are shown as single respective units, the computer system 500 may, in some embodiments, contain multiple I/O bus interface units 510, multiple I/O buses 508, or both. Further, while multiple I/O interface units are shown, which separate the I/O bus 508 from various communications paths running to the various I/O devices, in other embodiments some or all of the I/O devices may be connected directly to one or more system I/O buses.

In some embodiments, the computer system 500 may be a multi-user mainframe computer system, a single-user system, or a server computer or similar device that has little or no direct user interface, but receives requests from other computer systems (clients). Further, in some embodiments, the computer system 500 may be implemented as a desktop computer, portable computer, laptop or notebook computer, tablet computer, pocket computer, telephone, smart phone, mobile device, or any other appropriate type of electronic device.

It is noted that FIG. 6 is intended to depict the representative major components of an exemplary computer system 500. In some embodiments, however, individual components may have greater or lesser complexity than as represented in FIG. 6, components other than or in addition to those shown in FIG. 6 may be present, and the number, type, and configuration of such components may vary.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to explain the principles of the embodiments, the practical application or technical improvement over technologies found in the marketplace, or to enable others of ordinary skill in the art to understand the embodiments disclosed herein.

What is claimed is:

1. A computer-implemented method for probabilistic prediction of system errors, the method comprising:
reading a system log, the system log comprising a plurality of log entries;
identifying, in the system log, a log entry indicating a system error;
identifying, in the system log, a set of symptoms associated with the system error, the set of symptoms including at least one symptom, each symptom comprising a log event associated with a timeframe prior to the system error, the timeframe for each symptom having a range and a distance from the system error;
determining a variable score for each symptom, the variable score determined according to the symptom's timeframe, consistency of the symptom's appearance with the error, and occurrence frequency of the symptom throughout the system log;

creating an error profile for the error, the error profile storing the set of symptoms associated with the error and each symptom's variable score, the symptoms in the set ranked according to their variable scores;

displaying the error profile and the set of ranked symptoms on a graphical user interface, the graphical user interface allowing a user to set a threshold value for each symptom;

storing the threshold values in the error profile;

identifying, in the system log, a new occurrence of the set of symptoms;

determining, in response to identifying the new occurrence of the set of symptoms, that each symptom's variable score exceeds a threshold value for the symptom; and providing, in response to determining that each symptom's variable score exceeds the threshold value for the symptom, a predictive alert indicating the system error is probable.

2. The method of claim 1, further comprising: updating, in response to a new occurrence in the system log of a symptom in association with the system error, an existing variable score of the symptom in the set; and updating a ranking, in the error profile, of the variable scores to reflect the updated variable score.

3. The method of claim 1, further comprising:

updating, in response to a regularly-appearing symptom failing to appear at an expected time, an existing variable score of the symptom; and updating a ranking, in the error profile, of the variable scores to reflect the updated variable score.

4. The method of claim 1, further comprising:

identifying a new symptom associated with the error; and adding the new symptom to the set of symptoms.

5. The method of claim 1, wherein the symptom is a log entry.

6. The method of claim 1, wherein the symptom is an absence of a log entry.

7. The method of claim 1, wherein the threshold value for each symptom is set by a user.

8. The method of claim 1, wherein the threshold value for each symptom is a default value set according to the symptom's variable score, occurrence frequency throughout the system log, and distance from the error.

9. The method of claim 1, wherein identifying the new occurrence of the set of symptoms occurs in real-time by monitoring log entries as they are entered into the system log.

10. A system for probabilistic prediction of system errors, the system comprising:

a memory; and a processor in communication with the memory, wherein the system is configured to perform a method comprising:

reading a system log, the system log comprising a plurality of log entries;

identifying, in the system log, a log entry indicating a system error;

identifying, in the system log, a set of symptoms associated with the system error, the set of symptoms including at least one symptom, each symptom comprising a log event associated with a timeframe prior to the system error, the timeframe for each symptom having a range and a distance from the system error;

determining a variable score for each symptom, the variable score determined according to the symptom's timeframe, consistency of the symptom's appearance with the error, and occurrence frequency of the symptom throughout the system log;

creating an error profile for the error, the error profile storing the set of symptoms associated with the error and each symptom's variable score, the symptoms in the set ranked according to their variable scores;

displaying the error profile and the set of ranked symptoms on a graphical user interface, the graphical user interface allowing a user to set a threshold value for each symptom;

storing the threshold values in the error profile;

identifying, in the system log, a new occurrence of the set of symptoms;

determining, in response to identifying the new occurrence of the set of symptoms, that each symptom's variable score exceeds a threshold value for the symptom; and providing, in response to determining that each symptom's variable score exceeds the threshold value for the symptom, a predictive alert indicating the system error is probable.

11. The system of claim 10, wherein the symptom is an absence of a log event.

12. The system of claim 10, wherein identifying the new occurrence of the set of symptoms occurs in real-time by monitoring log entries as they are entered into the system log.

13. A computer program product for probabilistic prediction of system errors, the computer program product comprising a computer readable storage medium having program instructions embodied therewith, wherein the computer readable storage medium is not a transitory signal per se, the program instructions executable by a processor to perform a method comprising:

reading a system log, the system log comprising a plurality of log entries;

identifying, in the system log, a log entry indicating a system error;

identifying, in the system log, a set of symptoms associated with the system error, the set of symptoms including at least one symptom, each symptom comprising a log event associated with a timeframe prior to the system error, the timeframe for each symptom having a range and a distance from the system error;

determining a variable score for each symptom, the variable score determined according to the symptom's timeframe, consistency of the symptom's appearance with the error, and occurrence frequency of the symptom throughout the system log;

creating an error profile for the error, the error profile storing the set of symptoms associated with the error and each symptom's variable score, the symptoms in the set ranked according to their variable scores;

displaying the error profile and the set of ranked symptoms on a graphical user interface, the graphical user interface allowing a user to set a threshold value for each symptom;

storing the threshold values in the error profile;

identifying, in the system log, a new occurrence of the set of symptoms;

determining, in response to identifying the new occurrence of the set of symptoms, that each symptom's variable score exceeds a threshold value for the symptom; and providing, in response to determining that each symptom's variable score exceeds the threshold value for the symptom, a predictive alert indicating the system error is probable.

14. The computer program product of claim 13, wherein the symptom is an absence of a log event.

15. The computer program product of claim 13, wherein identifying the new occurrence of the set of symptoms occurs in real-time by monitoring log entries as they are entered into the system log.

* * * * *